United States Patent Office 3,070,435
Patented Dec. 25, 1962

3,070,435
PRODUCTION OF NON-CAKING FERTILIZERS
Robert E. Reusser and Van C. Vives, Bartlesville, Okla., assignors to Phillips Petroleum Company, a corporation of Delaware
No Drawing. Filed Apr. 12, 1956, Ser. No. 577,634
16 Claims. (Cl. 71—64)

This invention relates to the production of non-caking fertilizers. In one aspect, it relates to the production of a free-flowing fertilizer which exhibits little or no tendency to cake on standing. In another aspect, it relates to a method for improving the storage stability of simple or mixed fertilizers in the form of well-defined granules of predetermined size. In a further aspect, it relates to the reduction of caking of granular fertilizers, containing ammonium nitrate, the granules of which have a predetermined size. In a still further aspect, it relates to the reduction of caking of granular fertilizers containing ammonium nitrate, the granules of which are coated with a novel conditioning agent.

While we propose by the practice of this invention to improve the storage stability of those fertilizer materials which normally tend to cake on standing, our invention is particularly applicable to improving the storage stability of ammonium nitrate, per se and amonium nitrate-containing, mixed fertilizers and the invention will be discussed as applied thereto. However, it is to be understood that we do not intend to limit our invention thereto but rather broadly intend by the practice of our invention to improve the storage stability of both simple and mixed commercially prepared fertilizers which normally tend to cake or set and which are produced in the form of well-defined granules of predetermined size.

One of the requirements of any fertilizer is that it must be in condition to be distributed satisfactorily from a fertilizer distributor. Many commercially prepared fertilizers tend to cake or become sticky either during storage, shipping, or after they are received by the customer. This condition greatly impairs the drillability of the fertilizer and increases the cost of its uniform distribution in the field. This condition can be partially relieved by producing the fertilizer material in the form of granules, by storing and shipping the fertilizer in moisture-proof containers, and by the use of various water-proofing or conditioning agents.

Different fertilizer materials cake for different reasons, but the primary cause of caking is usually the presence of moisture which induces a caked condition.

Ammonium nitrate has enjoyed wide use as a fertilizer because of its high nitrogen content and the ready availability of the nitrogen. Its pronounced tendency to cake, or set, under conditions of storage and shipping has provoked many attempts to overcome this caking tendency including treatments with water-proofing or moisture repelling conditioning agents such as resins, soaps, waxes, glycerine, urea, petrolatum, rosin, paraffin, koalin, kieselguhr, plaster of Paris, soapstone, and the like. However, the treatment of ammonium nitrate with these agents has resulted in only partial protection against caking or setting. The disasters at Oppau, Germany, in 1921, and at Texas City, in the United States in 1947, are believed to have been caused by the detonation of ammonium nitrate which was coated wtih certain organic materials and as a result, the most widely used coating agents today are such inorganic materials as clay and diatomaceous earth. These latter conditioning agents, though satisfactory in many respects, are relatively expensive and must be used in relatively large amounts.

Accordingly, an object of this invention is to provide an improved fertilizer.

Another object is to provide a method for producing a free-flowing fertilizer which exhibits little or no tendency to cake on standing.

Another object is to provide a cake-resistant fertilizer by coating well-defined granules thereof with a novel and inexpensive coating agent.

A further object is to provide a method for lessening the tendency of ammonium nitrate fertilizer to cake during storage and shipping.

A still further object is to provide an ammonium nitrate-containing fertilizer which may be readily distributed in the field.

Other objects and advantages of our invention will become apparent, to those skilled in the art, from the accompanying discussion and appended claims.

Now, according to our invention, it has been found that commercially prepared ganular fertilizer materials which normally tend to cake during storage and shipping can be rendered free-flowing by coating the individual granules with anhydrous magnesium sulfate. More specifically, we have found that granular or prilled ammonium nitrate can be rendered substantially cake-resistant, or free-flowing, by tumbling dry ammonium nitrate prills with finely divided anhydrous magnesium sulfate prior to bagging the product for storage and shipping. The ammonium nitrate thus treated by the practice of our invention is preferably produced in the prilling or Welland process because of the economy of this process. In this process, the ammonium nitrate is sprayed into an upright chamber or tower and solidifies while falling through this chamber, forming prills. After the prills are screened to a predetermined size, i.e., 8 to 20 mesh, cooled and dried, they are coated with anhydrous magnesium sulfate, according to the practice of this invention, by tumbling or rolling the prills and the anhydrous magnesium sulfate together. The adherent coating of anhydrous magnesium sulfate conditioning agent prevents caking of the ammonium nitrate prills even under widely fluctuating temperature and humidity conditions.

While the exact amount of anhydrous magnesium sulfate to be used will, of course, depend upon several variables such as the use to be made of the product, the conditions under which the product will be stored, the amount of cake-resistance desired, and the presence of other fertilizer material, best results are obtained when the amount of anhydrous magnesium sulfate employed is in the range between 0.75 and 3 percent by weight based on the fertilizer. A more preferred range is between 1.0 and 2.5 percent by weight on the same basis. Larger amounts can be employed if desired, however, the objects of this invention are generally achieved by employing the amounts stated above. If higher amounts of the anhydrous magnesium sulfates are employed, it is obvious that the amount of available nitrogen in the nitrate-anhydrous magnesium sulfate will be decreased. The anhydrous magnesium sulfate should be of a particle size sufficiently fine to pass susbtantially all of the compound through 150 mesh, preferably 325 mesh or higher. The presence of large particles is not objectionable but the objects of this invention are generally achieved by using particles in the ranges stated above.

While the preferred method of adding the finely divided anhydrous magnesium sulfate is to tumble or roll it with the ammonium nitrate prills, it is within the scope of this invention to employ any other method which will uniformly coat the dry nitrate fertilizer with the anhydrous magnesium sulfate. Furthermore, while we prefer to coat ammonium nitrate prills, it is also within the scope of this invention to coat grains, crystals, or other particles of predetermined size.

Other than the free-flowing properties which result when using anhydrous magnesium sulfate as a coating agent for the ammonium nitrate fertilizer, two other advantages resulting from the practice of this invention are the avoiding of organic compounds which might possibly promote detonation of the fertilizer, and the supplying of small beneficial amounts of magnesium to the soil.

The magnesium sulfate can be obtained in the anhydrous form from commercial sources, or it can be manufactured by driving off the water of hydration of magnesium sulfate heptahydrate or magnesium sulfate trihydrate. It is necessary that these hydrates of magnesium sulfate be converted to the anhydrous form, since these hydrates are unsatisfactory as coating agents for nitrate fertilizers.

Although this invention is of particular value to the preparation of cake-resistant ammonium nitrate, or ammonium nitrate-containing fertilizers, it is not limited thereto, but may be generally applied to the treatment of any commercially prepared granular fertilizer, whether simple or mixed, which normally tends to cake on standing, such as sodium and potassium nitrates, calcium nitrate, urea, mono-ammonium sulfate, ammonium sulfate, and the like.

The anhydrous magnesium sulfate used as a coating agent, according to the practice of this invention, prevents caking of fertilizers, such as ammonium nitrate, much more effectively and economically than the other agents which have been previously used for this purpose. This is evident from the following series of comparative tests in which samples of ammonium nitrate were coated with different coating agents and were examined and compared with samples of ammonium nitrate treated according to the practice of this invention.

EXAMPLE I

The moisture content of prilled ammonium nitrate fertilizer was adjusted to the desired level by spraying the amount of water required into a tumbling drum in which the ammonium nitrate prills were being tumbled. After the moisture content was adjusted, a portion of the nitrate fertilizer of the desired moisture content was then tumbled with a known amount of a coating agent. This tumbling of the fertilizer and conditioning agent was carried out approximately 20 minutes at 100 r.p.m. to provide uniform coating of the ammonium nitrate prills. The tumbling jar used for the addition of the coating agent was a round, glass, wide-mouthed quart jar. The coated ammonium nitrate prills were then subjected to a series of cyclic temperature storage tests.

In one test, which may be referred to as a "cake test," 55 gram portions of the coated ammonium nitrate prills prepared above were poured into cylinders of polyethylene, each of which cylinders had been fabricated from two layers of 1½ mil wall thickness polyethylene. The inside diameter of the polyethylene cylinder was 1⅞ inches, and the ends of the cylinder were plugged with Lucite blocks ½ inch thick and 1⅞ inches in diameter. The blocks were held in place in the cylinders by means of cellophane tape. These test cylinders were placed in a brass mold containing three holes each 4 inches deep and 2 inches in diameter. A bellows was then attached to the top of the mold so as to supply 24 p.s.i. pressure to the prills in the cylinders. The entire arrangement, bellows and mold, was then placed in a refrigerator and maintained at 35° F. for 16 hours. The mold and bellows were then placed in an oven for 9 hours at 110° F., returned to the refrigerator for another 16 hours at 35° F., and again placed in the oven for 9 hours at 110° F. The mold was then opened, and the nitrate cakes which had been formed were removed from the cylinders. The cross-sectional area of each cake was 2.75 square inches. The samples of coated ammonium nitrate had hardened to the form of cakes as the result of the cyclic temperature storage to such an extent that a certain pressure was necessary to break down the hardened cakes. The cakes were then tested to breaking in a Carver commercial press and the total pounds of pressure required to break the cake was recorded and the results are tabulated in Table I. The cake-breaking procedure is a modification of that described in Ind. & Eng. Chem., 33, 121–127 (1941).

In a second cyclic temperature storage test, which may be referred to as a "hot plate test," samples of ammonium nitrate prills coated with various conditioning agents as described above, were each placed in a pint jar in an amount sufficient to fill the jar approximately ½ to ⅔ full. The jar was then placed between two plates in such a manner that the plates were in contact with opposite sides of the jar. The temperature of one of the plates was maintained at 185° F. by means of a steam coil, and the temperature of the other plate was maintained between 68 and 77° F. by circulating tap water through a coil behind the plate. Each jar was left between the plates for 20 hours after which the jar was allowed to cool for 6 hours. The contents of the jar were then examined by visual observation, the results were recorded and are tabulated in Table I.

*Table I*

| Sample | Coating agent | Weight percent coating agent | Weight percent water in $NH_4NO_3$ | Hot plate test rating[a] | Cake test (total lbs. to break cake), runs | |
|---|---|---|---|---|---|---|
| | | | | | Duplicate | Average |
| 1 | $MgCO_3$ | 3.5 | 0.49 | 4 | | |
| 2 | MgO | 3.0 | 0.40 | Reacts[b] | | |
| 3 | Plaster of Paris | 3.5 | 0.42 | 4 | | |
| 4 | $CaCl_2$ | 2.5 | 0.42 | 2–3 | | |
| 5 | $CaSO_4$ (anhyd.) | 3.5 | 0.53 | 3 | | |
| 6 | $MgSO_4 \cdot 7H_2O$ | 2.5 | 0.45 | 3 | | |
| 7 | $MgSO_4 \cdot 3H_2O$ | 3.5 | 0.50 | 4 | | |
| 8 | Clay[c] | 3.5 | 0.34 | 3 | 425–380 | 402 |
| 9 | $MgCl_2 \cdot 2H_2O$ | 3.5 | 0.46 | 3[d] | | |
| 10 | $Al(OH)_3$ | 3.5 | 0.32 | 4 | | |
| 11 | $Mg(OH)_2$ | 3.5 | 0.32 | 3 | | |
| 12 | $MgSO_4$ (anhyd.) | 2.5 | 0.45 | 1+ | 0.5–2.5 | 1.5 |
| 13 | $MgSO_4$ (anhyd.) | 2.0 | 0.45 | 1+ | 17–1.0 | 9.0 |
| 14 | $MgSO_4$ (anhyd.) | 1.0 | 0.45 | 2 | 11–13 | 12.0 |
| 15 | $MgSO_4$ (anhyd.) | 0.5 | 0.40 | 2–3 | | |
| 16 | $MgSO_4$ (anhyd.)[e] | 2.5 | 0.29 | 1+ | 5 | 5 |
| 17 | Control | 0 | 0.42 | 4 | 1,025–1,010 | 1,018 |

[a] Hot plate test ratings (visual observation): 1—free-flowing; 2—90% free-flowing 3—over ½ firmly caked; 4—hard, solid cake.
[b] MgO reacts with the $NH_4NO_3$, cause evolution of $NH_3$.
[c] A commercial clay recommended by the manufacturer as a coating agent.
[d] Prills expanded an unusual amount during test.
[e] The coating agent was prepared by dehydrating Tech. Grade Epson Salts ($MgSO_4 \cdot 7H_2O$).

EXAMPLE II

In addition to the above-described cyclic temperature storage tests, 55-pound batches of uncoated ammonium nitrate prills were each treated with various coating agents, including the anhydrous magnesium sulfate of the instant invention. The prills were tumbled with the coating agents for approximately 20 minutes in a portable concrete mixer at approximately 22 r.p.m. and the resulting coated prills were bagged in polyethylene lined bags. The bags were placed at the bottom of piles 15 bags high and stored in a warehouse for approximately 3 months to simulate actual storage conditions. At the end of this period, the bags were cut open and the physical characteristics of the contents observed; the results are tabulated in Table II.

*Table II*

| Bag | Coating agent | Weight percent coating agent | Physical characteristics of bag contents at end of storage |
|---|---|---|---|
| 1 | Anhydrous magnesium sulfate. | 3 | Over 90 percent freeflowing. |
| 2 | Tricalcium phosphate | 3.5 | Over 50 percent firmly caked. |
| 3 | Dicalite | 3.5 | Approximately 50 percent firmly caked. |
| 4 | Mixture of Dicalite [a] Vermiculite | 1 / 0.5 | In form of a firmly caked solid. |
| 5 | Mixture of Dicalite [a] Vermiculite | 2 / 0.5 | Over 50 percent firmly caked. |
| 6 | Mixture of Celetom [b] Vermiculite | 2 / 0.5 | Approximately 50 percent in form of a firmly caked solid, rest was approximately 50 percent firmly caked. |

[a], [b] Commercial diatomaceous earth.

EXAMPLE III

Samples of the various batches of coated ammonium nitrate prills prepared as described in Example II were subjected to the second cyclic temperature storage test of Example I, referred to as the "hot plate test." The moisture contents of these samples were determined after heating them for two hours in an oven at 105° C. The results of this test are tabulated in Table III.

*Table III*

| Sample | Coating agent | Weight percent coating agent | Weight percent moisture when bagged | Hot plate test rating |
|---|---|---|---|---|
| 1 | Anhydrous magnesium sulfate | 3.0 | 0.14 | 2 |
| 2 | Tricalcium Phosphate | 3.5 | 0.39 | 4 |
| 3 | Dicalite | 3.5 | 0.44 | 4 |
| 4 | Mixture of: Dicalite / Vermiculite | 1 / 0.5 | 0.34 | 4 |
| 5 | Mixture of: Dicalite / Vermiculite | 2 / 0.5 | 0.43 | 4 |
| 6 | Mixture of: Celetom / Vermiculite | 2 / 0.5 | 0.32 | 4 |

One other advantage of our invention is that the novel coating agent, anhydrous magnesium sulfate, is compatible with other coating agents now used, such as Celetom, and in certain circumstances, e.g., economic considerations, it will be advantageous to mix these other agents with the anhydrous magnesium sulfate. As an example, we have found that ammonium nitrate prills coated with a mixture of 1.5 weight percent anhydrous magnesium sulfate and 3.5 weight percent Celetom were far less liable to caking than when they were coated with only 3.5 weight percent Celetom.

While the invention has been described in connection with a present, preferred embodiment thereof, it is to be understood that this description and the examples herein are illustrative only and it is not intended to limit the invention thereto. Various modifications will be apparent to one skilled in the art upon study of this disclosure and it is believed that such modifications are within the spirit and scope of this invention.

We claim:

1. A method for improving the storage stability of a granular nitrogen-containing fertilizer which normally tends to cake on standing which comprises uniformly coating the fertilizer granules with an agent comprising finely divided anhydrous magnesium sulfate by tumbling the same with said granular fertilizer, the amount of said anhydrous magnesium sulfate employed being sufficient to reduce the tendency of said fertilizer to cake on standing.

2. A method for improving the storage stability of a granular nitrogen-containing fertilizer which normally tends to cake on standing which comprises uniformly coating the fertilizer granules with an agent comprising finely divided anhydrous magnesium sulfate by tumbling the same with said granular fertilizer, the amount of anhydrous magnesium sulfate employed being in the range between 0.75 and 3 percent by weight of said fertilizer.

3. A method for improving the storage stability of a granular nitrogen-containing fertilizer which normally tends to cake on standing which comprises uniformly coating the fertilizer granules with an agent comprising finely divided anhydrous magnesium sulfate by tumbling the same with said granular fertilizer, the amount of anhydrous magnesium sulfate employed being in the range between 1.0 and 2.5 percent by weight of said fertilizer.

4. A method for improving a storage stability of a granular nitrogen-containing compound which normally tends to cake on standing which comprises uniformly coating the compound with an agent comprising finely divided anhydrous magnesium sulfate by tumbling the same with said nitrogen-containing compound, said nitrogen-containing compound being selected from the group consisting of ammonium nitrate, sodium nitrate, potassium nitrate, calcium nitrate, urea, mono-ammonium sulfate, and ammonium sulfate, the amount of said anhydrous magnesium sulfate employed being sufficient to reduce the tendency of said compound to cake on standing.

5. The method according to claim 4 wherein said nitrogen-containing compound is ammonium nitrate.

6. The method according to claim 4 wherein said nitrogen-containing compound is sodium nitrate.

7. The method according to claim 4 wherein said nitrogen-containing compound is potassium nitrate.

8. The method according to claim 4 wherein said nitrogen-containing compound is calcium nitrate.

9. The method according to claim 4 wherein said nitrogen-containing compound is urea.

10. The method according to claim 4 wherein said nitrogen-containing compound is mono-ammonium sulfate.

11. The method according to claim 4 wherein said nitrogen-containing compound is ammonium sulfate.

12. The method of reducing the tendency of ammonium nitrate granules to cake on standing, comprising tumbling the granular material with anhydrous magnesium sulfate having a particle size sufficiently fine to pass through a 325 mesh to form a thin, uniform adherent coating of the sulfate firmly attached to the nitrate granules.

13. As a new article of manufacture a granular nitrogen-containing fertilizer, the individual granules thereof having a relatively thin, uniform coating comprising anhydrous magnesium sulfate adhering thereto in an amount sufficient to reduce the tendency of the fertilizer to cake on standing.

14. The article of manufacture according to claim 13 wherein the amount of anhydrous magnesium sulfate is in the range of 0.75 to 3 percent by weight of the fertilizer.

15. The article of manufacture according to claim 13 wherein the amount of anhydrous magnesium sulfate is in the range of 1.0 to 2.5 percent by weight of the fertilizer.

16. The article of manufacture according to claim 13 wherein said nitrogen-containing fertilizer is ammonium nitrate.

References Cited in the file of this patent
UNITED STATES PATENTS

| | | |
|---|---|---|
| 1,868,890 | Eyer et al. | July 26, 1932 |
| 1,966,947 | Eyer et al. | July 17, 1934 |
| 2,008,469 | Prince | July 16, 1935 |
| 2,224,834 | Reichert et al. | Dec. 10, 1940 |
| 2,307,253 | Yee | Jan. 5, 1943 |
| 2,399,987 | Cordie et al. | May 7, 1946 |
| 2,625,514 | Kirschenbayer | Jan. 13, 1953 |
| 2,669,510 | Dresser | Feb. 16, 1954 |